United States Patent [19]

Hwo et al.

[11] Patent Number: 5,594,074
[45] Date of Patent: Jan. 14, 1997

[54] PROCESS FOR IMPROVING PROCESSABILITY OF ULTRA LOW MELT VISCOSITY POLYMER

[75] Inventors: Charles C. Hwo; Chin-Yuan G. Ma, both of Sugar Land; James D. McCullough, Jr., Houston, all of Tex.

[73] Assignee: Shell Oil Company, Houston, Tex.

[21] Appl. No.: 395,365

[22] Filed: Feb. 21, 1995

[51] Int. Cl.$^6$ ........................................................ C08F 8/00
[52] U.S. Cl. ........................................ 525/387; 525/333.8
[58] Field of Search .............................................. 525/387

[56] References Cited

U.S. PATENT DOCUMENTS

| | | |
|---|---|---|
| 4,451,589 | 5/1984 | Morman et al. . |
| 4,514,534 | 4/1985 | DiNardo . |
| 4,578,430 | 3/1986 | Davison . |
| 4,861,834 | 8/1989 | Audureau et al. . |
| 4,897,452 | 1/1990 | Berrier et al. . |
| 5,264,493 | 11/1993 | Palate et al. . |

*Primary Examiner*—Bernard Lipman
*Attorney, Agent, or Firm*—Grace Tsang

[57] ABSTRACT

A process for making polymer pellets comprising unreacted free radical generator which can be degraded upon thermal treatment to form an ultra low melt viscosity polyolefin, which process comprises the steps of adding polyolefin and free radical generator required for the degradation in the extruder to the first half section of an extruder and injecting, optionally through a side-arm extruder, another portion of free radical generator near the exit of the extruder to provide a sufficient amount of unreacted free radical generator in the pellets produced, and followed by pelletizing the resulting molten mixture to form uniform non-sticky pellets.

21 Claims, 1 Drawing Sheet

PROCESS FOR IMPROVING PROCESSABILITY OF ULTRA LOW MELT VISCOSITY POLYMER

FIELD OF THE INVENTION

This invention relates to an improved process for the manufacture of pellets of ultra low melt viscosity polyolefin, which process involves the degradation or "cracking" of $C_3$–$C_{18}$ alpha-monoolefin polymers in the presence of free radical generators in a pelletizing extruder. Particularly, this invention relates to a novel degradation process for improving the pelletizing characteristics of the degraded polymers.

BACKGROUND OF THE INVENTION

It is known that ultra low melt viscosity polymers are useful for the production of a variety of products such as adhesives, sealants, coatings, non-woven fabrics by melt blown fiber processes, injection-molded components made at a high rate, etc. An ultra low melt viscosity polymer has a melt viscosity of about 300,000 centipoise (hereinafter "cps") or lower. The melt viscosity of an ultra low melt viscosity polymer can be as low as 500 cps or smaller.

However, it is difficult to use a polymerization process to obtain directly polymers of a very low melt viscosity because, due to their particular nature, such polymers can require complex and costly operations during their preparation primarily in relation to the use of solvents, especially operations of separating the polymers from the solvents in which they are prepared. Thus, it has been proposed to prepare olefinic polymers with a relatively high melt viscosity according to the usual polymerization processes and then to subject these polymers to a thermomechanical degradation treatment in the presence of a free radical generator, under such conditions that the melt viscosity of these polymers decreases to the desired value. In theory, during this treatment, the thermal decomposition of the free radical generator, such as a peroxide, can cause the macromolecular chains of the olefinic polymer to break and thus the melt viscosity of the polymer to decrease.

As used herein, a high melt viscosity polymer is a polymer having a melt viscosity 1,000,000 cps or more; and an ultra low melt viscosity polymer is a polymer having a melt viscosity of about 300,000 cps or lower. A polymer with a melt viscosity of about 300,000 cps will have a melt index of approximately 100 dg/min, and is generally regarded as an ultra high melt flow rate polymer with an ultra high melt index. As used herein, the melt viscosity is measured by Brookfield Viscometer using ASTM D2556 at 350 degrees Farenheit (°F.), unless otherwise specified e.g. as measured at 275° F. As used herein, the melt flow rates or melt indices are measured by ASTM 1238 condition E at 190° C. and 2.16 g wt.

The pelletization of thermoplastic materials is of considerable importance for many applications. Pellets, unlike ingots or bars, readily flow in measuring and dispensing apparatuses and the size of pellet charges can be readily controlled to small tolerances. Moreover, unlike powders, they do not form dust and are not ingested by persons working with them. Thus, they provide a highly convenient form for the packaging, storage and use of many thermoplastic polymers.

It is known to carry out the thermomechanical degradation treatment in the presence of a free radical generator in an extruder, either during pelletization of the polymer or during the conversion of the pellets into finished articles. However, when the intention is to produce finished articles from, but not limited to, butylene and/or propylene polymer with very low melt viscosity, i.e. very high melt index, it can be difficult to carry out this degradation treatment effectively. When the degradation treatment is carried out in a pelletizing extruder, the polymer leaving the extruder becomes so fluid and so soft that it is difficult or even impossible to cut into pellet form. Moreover, the pellets consisting of these polymers of very high melt index can be sticky and can tend to agglomerate, making handling very difficult.

Attempts to pelletize ultra low melt viscosity polyolefins cracked by the conventional processes result in an excess amount of non-uniform or malformed pellets which may be described by terms such as tailed pellets, long-string pellets, pellet marriages, elbows, dog bones, and pellet trash. Malformed and non-uniform pellets are undesirable since they tend to bridge in pellet feed hoppers and to block pellet conveying systems. Further, significant amounts of malformed pellets alter the bulk density of the pellet stock which causes feeding problems in the extrusion line and which may result in voids in the final product. In addition to malformed pellets, trashouts occur frequently during production of ultra low melt viscosity polyolefins. Trashouts are extruder shutdowns resulting from polymer buildup on the rotating knives.

The user of the pellets, i.e. the converter, is generally someone other than the manufacturer of the polymers and of the pellets. When the converter employs this degradation treatment during the conversion of the pellets into finished articles, he must modify and adapt the extruders or other converting devices and the conditions of their use, in order to effectively process each type of pellet. In particular, he must equip the extruders or other converting equipment with a device for introducing and metering the free radical generator, while satisfying safety constraints due to the thermal instability of these materials. It has been observed that when this degradation treatment is carried out with a polymer which is not in the form of a powder but in the form of pellets, the dispersion of the free radical generator in the polymer may be relatively more difficult and the lack of homogeneity of the mixture may locally result in excessive degradation of the polymer.

The users of the pellets usually mix the pellets in an appropriate equipment at a selected temperature with additional ingredients such as additives, other polymers, and antioxidants to form a blend in its molten state before converting the mixture containing the pellets into finished articles. Thus, the viscosity of the pellets must be sufficiently low so that the blending or mixing operation can be successfully conducted without causing mechanical breakdown of the mixing stirrer because of the high shear resistance from the molten mixture.

It is therefore desirable to crack the polymer during the extrusion pelletization stage as much as possible to meet the melt viscosity specification required by the end users, while at the same time stay within the melt viscosity range which cracked polymer can easily be mechanically cut into non-sticky uniform pellets by the pelletizer.

It is also desirable to control the consistency of the degree of degradation in the extruder to have a narrow molecular weight distribution of the polymer in the pellets to prepare pellets of a quality which is as constant as possible. It is further desirable to control the constancy of the concentration of the live or intact, i.e. unreacted, free radical generators in the pellets. Such reproductability in the manufacture of the pellets advantageously reduces the need for the end users, the converters, to constantly change the settings of the converting equipment intended to convert the pellets into finished articles.

U.S. Pat. No. 4,451,589, assigned to Kimberly-Clark proposes a degradation process wherein greater than about 50% added peroxide remains available for further degradation after pelletizing. The peroxide can be added either prior to or during the extrusion process. No mention was made to multiple additions of peroxide during the extrusion process. The single point addition of large amount of peroxide as proposed by this reference often end up with lack of control of the consistency of the degree of degradation and thus a large percentage of recoverable and unrecoverable products which do not meet the blending and/or shipping specifications.

U.S. Pat. No. 4,897,452, assigned to BP Chemicals, proposes a degradation process involving adding to the polymer two free radical generators, G1 and G2, the half-life of G2 being at least 20 times longer than that of G1 at the pelletizing temperature. This process requires the use of G2 with relatively long half life. The process has the disadvantage of requiring high temperature and/or prolonged heating during the conversion of the pellets into finished articles by the converters or end users in order to completely decompose the G2 free radical generators.

Thus, a need has been demonstrated for a process of degrading a polyolefin, producing polymer pellets of a constant quality, including constancy in viscosity, in a reproducible manner, while minimizing the viscosity of the polymer to meet the viscosity specification required by the customer, at the same time being easily cut into non-sticky pellets without excessive free radical prodegradant, and when heated undergoes further degradation producing a ultra low melt viscosity polymer without excessive heating.

SUMMARY OF THE INVENTION

The present invention relates to a process for making polymer pellets containing unreacted free radical generator which can be degraded upon thermal treatment to form an ultra low melt viscosity polyolefin having a melt viscosity of from about 500 to about 300,000 centipoise (cps), which process comprises the steps of:

(1) feeding a polymeric feedstock comprising a polyolefin having a melt index of from about 0.2 to about 100 dg/minute measured by ASTM 1238 condition E at 190° C. and 2.16 g wt to a main extruder through a feeding device, (2) determining amount (x) of free radical generator required to degrade said polyolefin from step (1) in said main extruder, under temperature(s) and residence time of said main extruder, to a polymer having a viscosity in a range which is (i) sufficiently high to allow easy pelletization by pelletizer into tractable uniform non-sticky pellets with less than 2% pellet agglomerates, and (ii) sufficiently low to allow blending without causing mechanical breakdowns of the mixing device by end user of the pellets;

(3) determining amount of loss (y) of unreacted free radical generator during extrusion process;

(4) determining total amount (z) of free radical generator required for degradation and loss in the main extruder by adding the amount x from step (2) with the amount of y from step (3), wherein $z=x+y$;

(5) adding said free radical generator in an amount from about 0.7 to about 1.2 time of z determined in step (4) above to (i) first half section of the main extruder or (ii) prior to the feeding of said polymeric feedstock to form a first mixture;

(6) cracking said first mixture in said main extruder under heat;

(7) adding a second mixture comprising (i) from about 0.1 to about 100 wt % of a free radical generator, and (ii) from about 0 to about 99.9 wt % of said polymeric feedstock into last half section of the main extruder, optionally through a side-arm extruder, to form a third mixture;

(8) passing said third mixture exiting the end of the main extruder to a pelletizer to form pellets;

wherein said second mixture is added in step (7) in an amount which provides sufficient amount of unreacted free radical generator in the pellets produced from step (8) above available for subsequent decomposition and cracking of the polymer in the pellets to form an ultra low melt flow polymer having from about 500 to about 300,000 cps;

wherein the half life of the free radical generator used in step (5) is within about 0.1–1.0 times the half life of the free radical generator used in step (7).

BRIEF DESCRIPTION OF THE DRAWING

The accompanying drawing.

DESCRIPTION OF THE EMBODIMENTS

Figure 1:
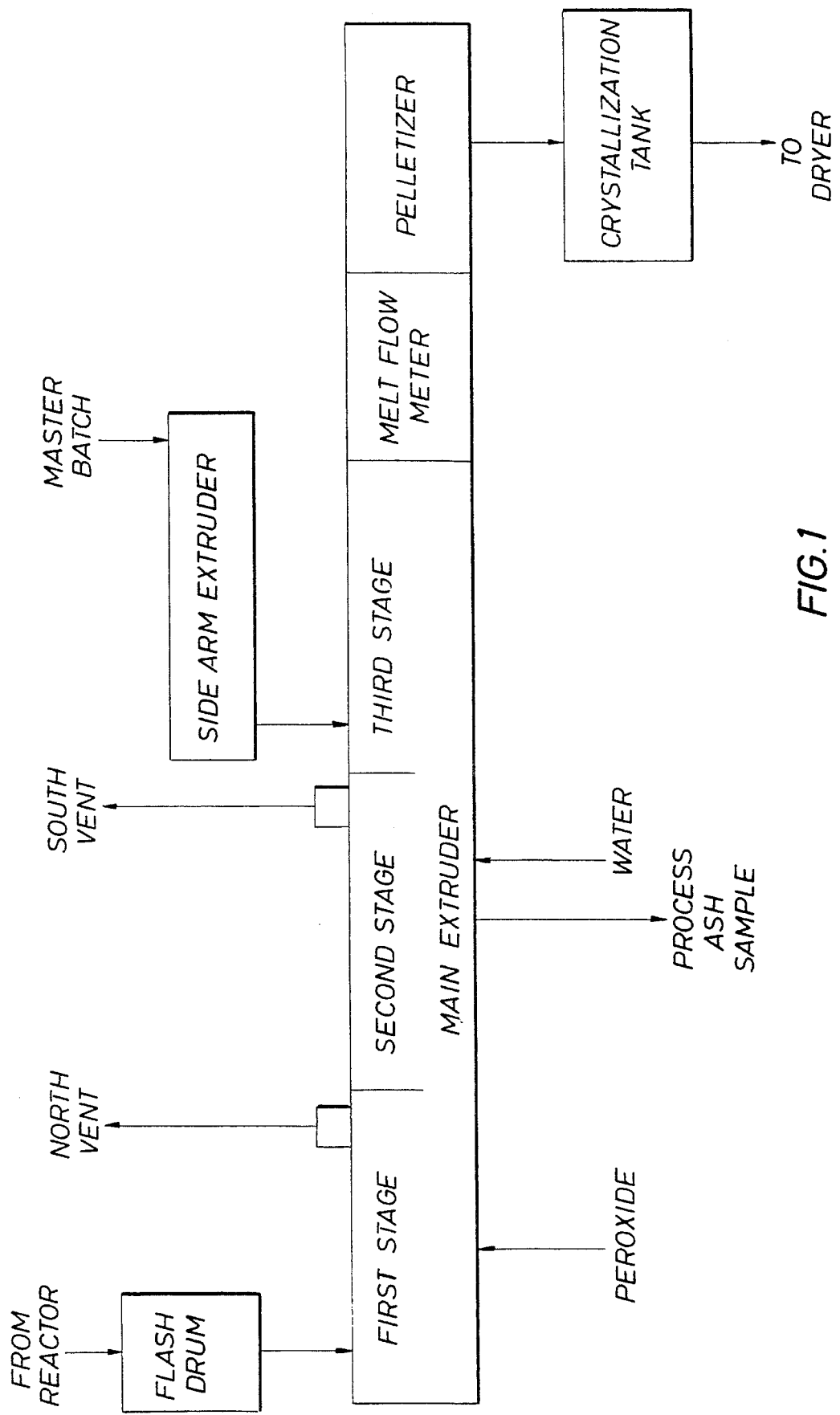
FIG. 1, represents diagrammatically one general arrangement of apparatus for carrying out the novel process. The accessories such as valves, pumps and control instruments not necessary for the purpose of understanding the present invention are not (all) shown.

The present invention involves a process of extrusion degradation of a polyolefin to form a degraded polymeric melt, which can be easily cut into non-sticky polymeric pellets containing unreacted free radical generator which can be degraded upon thermal treatment to form an ultra low melt viscosity polyolefin having a melt viscosity of from about 500 to about 300,000 centipoise (cps). Applicants have unexpectedly found that the process of the present invention produces pellets produced of a constant quality, including constancy in viscosity through consistency of the degree of degradation as well as improved control of the constancy of the concentration of unreacted free radical generators in the pellets, while the viscosity of the polymer is minimized to meet the viscosity specification required by the end users of the pellets to allow blending with ease without mechanical breakdowns of the mixing device.

While the present invention is described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims. The present invention is also applicable to the processing of waste polymer material to permit reuse in various applications. It will be apparent to one skilled in the art, optimum operating conditions and concentrations will vary depending upon the properties of the polymer being used and the ultimate properties desired by the end users of the pellets.

The present process is suitable for cracking and pelletizing of any polyolefin, preferably polyolefins containing monomers of three to eighteen carbon atoms having a melt indices of from about 0.2 to about 100 dg/minute, more preferably from about 0.2 to about 50 dg/minute, still more preferably from about 0.2 to about 20 dg/minute. Polymers with melt indexes of less than 20 dg/minute are generally regarded as low melt flow rate polymers. The polyolefin can be highly crystalline, semi-crystalline, elastomeric, relatively amorphous, or essentially amorphous. Illustrative examples of the suitable polyolefins include, but not limited to, butene-1 homopolymer, butene-1 copolymer, butene-1-ethylene copolymer, butene-1-propylene copolymer, propylene homopolymer, propylene copolymers, ethylene copolymers, a mixture of thereof, etc. A specific embodiment of the present invention uses butene-1-ethylene copolymer consisting essen-tially of from about 2 wt % to about 8 wt % of ethylene and from about 92 wt % to about 98 wt % of butene-1 having a melt index from about 0.1 to about 3.0 dg/min. Another specific embodiment of the present invention uses a mixture of a butene-1 homopolymer or copolymer (hereinafter "homo(co) polymer") with a propylene homo(co) polymer. Still another specific embodiment of the present invention uses a mixture of butene-1 homo(co) polymer, propylene homo(co) polymer, and less than about 25 wt % of ethylene homo(co)polymer.

In accordance with the present invention, referring to the accompanying drawing, FIG. 1, a polyolefin feedstock, typically produced from a reactor, is introduced into a main extruder. The main extruder is generally a device for mixing and heating a polymer mixture. Non-limiting examples of the suitable extruders include single screw extruder, and twin screw extruder. Suitable extruders typically are from about 50 inches to about 1000 inches, preferably from about 200 to about 500 inches, and more preferably from about 250 to about 400 inches in length. The residence time for the polymeric feedstock in the main extruder is typically in the range of from about 30 seconds to about 20 minutes, preferably from about 2 minutes to about 6 minutes, more preferably from about 3 minutes to about 5 minutes.

The extruder typically has a plurality of heating zones and is operated typically through a plurality of stages. The set temperatures of the heating zones will vary depending upon the properties of the polymers and the free radical generators, including the half-life of the free radical generator at operating temperatures. It is to be noted that during the extrusion process, a substantial amount of heat is often generated from shear heating and cracking reaction. Thus, the temperature of the polymeric melt in the extruder may be substantially higher than the temperature set in the heating zone(s) at the barrel of the screw, and may also be substantially higher than the actual zone temperature readings in the extruder. Further, the actual zone temperature readings in different stages of the extruder may also be higher than the temperatures set at the heating zones. Non-limiting examples of the temperatures set for the heating zones include from about 90° F. to about 500° F., specifically from about 150° F. to about 375° F., more specifically from about 180° F. to about 350° F.

A free radical generator or a mixture of free radical generators is typically added to the main extruder at the first half section of the main extruder, preferably at the first one-third section of the main extruder, and more preferably at the first one-quarter section of the main extruder.

In a specific embodiment of the present invention, the amount (z) of the free radical generator added at the first one-half section of the extruder is the sum of the amount x required for cracking in the main extruder and the amount of y which is the amount of free radical generator lost during the extrusion process. The amount x is the amount of the free radical generator(s) required to degrade the polyolefin feedstock in the main extruder, under temperature(s) and residence time of the main extruder, to a polymer having a viscosity in a range which meets at least two criteria: (1) the viscosity must be sufficiently high to allow easy pelletization by the pelletizer into tractable uniform non-sticky pellets with less than 5%, preferably less than 2 wt %, more preferably less than 0.5 wt % pellet agglomerates, and the frequency of extruder shutdowns resulting from polymer buildup on the rotating knives of the pelletizer is minimized; and (2) the viscosity of the polymer after degradation in the main extruder must be sufficiently low to allow blending without causing mechanical breakdowns of the mixing device by the end users of the pellets.

Optionally, the main extruder may contain one or more vent(s) for ventilating the side products produced from the cracking process. The vent(s) are located in the main extruder at a position after the injection point of the first free radical generator(s) and prior to the last injection point of the free radical generator(s). A portion of the free radical generator, especially when it is a liquid with a low boiling point, may evaporate from the vent(s) and resulting in the loss of free radical generators. The loss of the free radical generators from the vent(s) is in the range from about 0 wt % to about 60 wt %, specifically from about 10 wt % to about 50 wt %, more specifically from about 25 wt % to about 35 wt %, still more specifically about 33 wt %.

The amount (y) of free radical generator lost during the extrusion process, including the ventilations through the vent(s), can be determined by adding a predetermined amount of free radical generator(s) to a polymeric feedstock in an extruder with vent(s) open and determining the concentration of the free radical generator(s) contained in the polymeric mixture exiting the extruder, e.g. using a gas liquid chromatography; repeating the same process with vent(s) closed; and determining the difference of the concentration of the free radical generator(s) contained in the polymeric mixture exiting the extruder.

The total amount (z) of free radical generator required for degradation and loss in the main extruder can be determined by adding x to y, i.e. using the equation: $z=x+y$.

In a specific embodiment of the present invention, free radical generator(s) in an amount from about 0.5 to about 1.5 time(s), preferably from about 0.7 to about 1.2 time(s), more preferably from about 0.9 to about 1.1 time(s) of z is added to the first one-half section of the main extruder. It can be added in one single injection, or in a plurality of injections.

The polymeric feedstock in combination with the free radicals added in the first stage of the main extruder is subsequently cracked in the extruder. As a specific embodiment of the present invention, at least 70%, preferably at least 80%, more preferably at least 90% of the free radical generators injected in the first half section of the extruder are decomposed, reacted or lost before reaching the exit of the main extruder.

Applicants have found by surprise that the present invention, by the controlled addition of the free radical generators in the first section of the extruder, in combination with the consitrolled addition of free radical generators in the last section of the extruder, produces polymer pellets with improved constancy in viscosity, with higher percentage of prime pellets produced which meets viscosity specification required by the end user.

A second portion of free radical generator(s) is added into last one-half section, preferably the last one-third section, more preferably the last one-quarter section, even more preferably immediately before the exit of the main extruder. Again, this can be added in one single injection, or in an incremental multiple injections. The free radical generator(s) can be added directly to the main extruder, or it can be added in the form of a mixture (masterbatch), e.g. comprising (i) from about 0.1 to about 100 wt % of free radical generator(s), and (ii) from about 0 to about 99.9 wt % of the polymeric feedstock. As a specific embodiment, the free radical generator(s) is added in a masterbatch contain from about 1 wt % to about 10 wt %, more specifically from about 1.5 wt % to about 2.5 wt % of free radical generator(s) to the mixture. The masterbatch can be added to the main extruder directly. In a specific embodiment of the present invention, the masterbatch containing the free radical generator(s) is first extruded in a side-arm extruder, optionally under heat, to be homogenized before the addition to the main extruder.

In a specific embodiment of the present invention, the masterbatch is added to the main extruder so that the masterbatch is mixed with the polymeric melt in the main extruder in a ratio from about 1:19 to about 1:1, more specifically from about 1:9 to about 1:3, even more specifically from about 1:5 to about 1:6. The residence time of the side-arm extruder ranges from about 10 seconds to about 2 minutes, specifically from about 20 seconds to about 1 minute, more specifically from about 30 seconds to about 45 seconds. The side-arm extruder primarily provides a convenient means for introducing the free radical generator via masterbatch to the main extruder. Since the residence time in the side-arm extruder is very short and the shear heating is very low due to its special design, the decomposition of the free radical generator in the side-arm extruder is thus minimal.

The second portion of the free radical generator(s) is added in an amount which provides sufficient amount of unreacted free radical generator(s) in the pellets available for subsequent decomposition and cracking of the polymer in the pellets to form an ultra low melt viscosity polymer having from about 500 to about 300,000 cps, preferably from about 3,000 to about 150,000 cps, and more preferably from about 6,500 to about 105,000 cps.

The addition of the second portion of the free radical generator(s) at the last stage of the extruder, specifically very close to the end of the extruder, unexpectedly resulted in an improved control of the constancy of the concentration of the unreacted free radical in the pellets. Such reproductability in the manufacture of the pellets advantageously reduced the need for the end users of the pellets to constantly change the settings of the converting equipment intended to convert the pellets into finished articles.

In a specific embodiment of the present invention, the 1 hr. half life temperatures, i.e. the temperature at which the time required for one-half of the free radical generator to decompose is one hour, of the free radical generators suitable for use in the present process are in the range from about 110° C. to about 150° C. Such half lives properties advantageously provide sufficient cracking efficiency in the extrusion step and during the conversion of the pellets into finished articles, and avoid prolonged heating at a high temperature otherwise required during the conversion step by the end users.

Illustrative Examples of suitable peroxides include, but not limited to, the peroxides listed in TABLE 1 below.

TABLE 1

| CHEMICAL NAME OF PEROXIDE | 1 HR. HALF LIFE TEMP (°C.) |
|---|---|
| t-butylperoxy-maleic acid | 110 |
| OO-t-butyl O-isopropyl mono-peroxycarbonate | 119 |
| OO-t-butyl O-(2-ethoxyl)mono-peroxycarbonate | 121 |
| 2,5-dimethyl 2,5-di(benzoyl-peroxy)hexane | 118 |
| OO-t-amyl O-(2-ethylhexyl) mono peroxy carbonate | 117 |
| t-butylperoxy acetate | 120 |
| t-amyl peroxy acetate | 120 |
| t-butylperoxy benzoate | 125 |
| t-amyl peroxy benzoate | 121 |
| di-t-butyl diperoxy-phthalate | 123 |
| dicumyl peroxide | 135 |
| 2,5-dimethl-2,5-di(t-butylperoxy)hexane | 138 |
| t-butyl cumyl peroxide | 142 |
| α-α-bis(t-butylperoxy) diisopropylbenzene | 137 |
| di-t-butyl peroxide | 149 |
| 2,5-dimethyl-2,5-di(t-butylperoxy)hexyne-3 | 149 |
| n-butyl-4,4-bis(t-butylperoxy)valerate | 129 |
| 1,1-di(t-butylperoxy)3,3, 5-trimethyl cyclohexane | 112 |
| 1,1-di(t-butylperoxy) cyclohexane | 112 |
| 1,1-di-(t-amylperoxy) cyclohexane | 112 |
| 2,2-di(t-butyl-peroxy)butane | 122 |
| ethyl-3,3,-di(t-butylperoxy) butyrate | 135 |
| 2,2-di(t-amyl peroxy) propane | 128 |
| ethyl 3,3-di(t-amhylperoxy) butyrate | 132 |

The chemical composition of the free radical generator(s) injected to the first one-half section (or the first stage) of the extruder and that added to the last one-half (or the last stage) can be identical. In the alternative, two different free radical generators or mixtures of free radical generators can be added, with the provision that the half life of the free radical generator(s) used in the first injection(s) in the first one-half section of the extruder is within about 0.1 to about one times the half life of the free radical generator(s) injected into the last one-half section of the extruder.

At the exit of the extruder, the polymeric melt is continuously extruded through the orifices of the die plate into water filled housing. The polymeric melt is pelletized into pellets using any convenient means known in the art. In one specific embodiment of the present invention, the molten polymer from the extruder is fed to a pelletizer in which the polymer flows through the holes of die plate and cut by knives to form into pellets, which are immediately quenched by chill water in the crystallization tank. In another specific embodiment of the present invention, the polymeric strands are extruded and while immersed in water, they are cut into short lengths or pellets and are then quickly cooled by the water and carried in suspension from the housing to a collection station.

The polymer in the pellets produced will have a viscosity from about 50,000 cps to about 500,000 cps, preferably 100,000 to about 500,000 cps, more preferably from about 200,000 to about 500,000 cps measure by Brookfield Viscometer using ASTM D2556 at 275° F.; and a melt viscosity of from about 500 cps to about 300,000 cps, preferably from about 3,000 to about 150,000 cps, and more preferably from about 6,500 to about 105,000 cps measured by Brookfield Viscometer using ASTM D2556 at 350° F. The melt viscosity measured at 350° F. reflects the viscosity of the pellets after being fully cracked, and that measured at 275° F. reflects the viscosity of the pellets produced from the extrusion pelletization which provides an indication of the processability of the pellets, such as ease of pelletization and ease of blending with other ingredients at a selected temperature by the end users. The melt viscosity of the polymeric melt and/or pellets can be measured by a melt flow meter located at or after the third stage of the extruder. The melt viscosity can be adjusted, e.g. by changing the temperature settings of the heating zones, and adjusting the concentrations of the free radical generator(s) injected.

In a specific embodiment of the present invention, a process is provided for making polymer pellets comprising unreacted 2,5-dimethyl-2,5-di(t-butylperoxy) hexane which can be degraded upon thermal treatment to form ultra low melt viscosity butene-1-ethylene copolymer having a melt viscosity measured by Brookfield Viscometer using ASTM D2556 at 350° F. of from about 3,000 to about 150,000 centipoise, preferably from about 6,500 cps to about 105,000 cps. The process comprises the steps of feeding a polymeric feedstock comprising a butene-1-ethylene copolymer consisting essentially of (i) from about 92 wt % to about 98 wt % of butene-1 and (ii) from about 2 wt % to about 8 wt % of ethylene having a melt index of from about 0.1 to about 3.0 dg/min measured by ASTM 1238 condition E at 190° C. and 2.16 g wt to a main extruder through a feeding device, wherein total residence time for the polymeric feedstock in the main extruder from the feeding device to end of the main extruder ranges from about 2 minutes to about 6 minutes. In this specific process, from about 800 to about 3500 ppm of 2,5-dimethyl-2,5-di(t-butylperoxy) hexane is added to the polymeric feedstock (i) into about first one third section of the main extruder, or (ii) prior to the feeding of said polymeric feedstock to said extruder to form a first mixture. This first mixture is cracked in the main extruder under heat. Subsequently, a second mixture comprising (i) from about 0.1 wt % to about 100 wt % of 2,5-dimethyl-2,5-di(t-butylperoxy) hexane and (ii) from about 0 to about 99.9 wt % of said polymeric feedstock is added into the last one third section of the main extruder to form a third mixture, which is passed through the exit of the extruder to a pelletizer to form pellets. The degraded butene-1-ethylene copolymer in the polymer pellets has a viscosity of from about 200,000 cps to about 500,000 cps measured at 275° F. using ASTM D2556 and from about 3,000 to about 150,000 cps measured at 350° F. using ASTM D2556. The second mixture containing peroxide is added to the main extruder in such amount that the polymer pellets produced comprises from about 2900 to 3500 ppm of unreacted peroxide. Optionally, the second mixture is passed through a side-arm extruder prior to the addition to the last one third section of the main extruder. Optionally, the main extruder comprises at least one vent at a position after the position at which the first portion of 2,5-dimethyl-2,5-di(t-butylperoxy)hexane is added to the main extruder and before the second mixture is added to the main extruder in the last stage of the extruder.

The invention will be illustrated by the following illustrative embodiments which are provided for illustration purpose only and are not intended to limit the scope of the instant invention.

ILLUSTRATIVE EMBODIMENTS

The following illustrative embodiments describe typical techniques of the present invention for producing ultra high melt viscosity polyolefins with improved pelletizing properties and constancy in quality.

ILLUSTRATIVE EMBODIMENT I

PART I: FEEDSTOCK POLYMER

Butene-1-ethylene copolymer containing 5.5 wt % of ethylene having a melt index of about 0.2–0.4 dg/min was produced from a polymerization reactor by polymerizing butene-1 with ethylene using a titanium trichloride catalyst containing as cocatalyst diethylaluminum chloride/diethyl aluminum iodide. The polymer produced from the reactor is first transferred to a catalyst extractor and then a catalyst separator and thereafter heated in a preheater before being passed to a flash drum to remove unreacted monomers and oligomers.

PART II: EXTRUSION DEGRADATION

Referring to FIG. 1, the molten polymer produced from PART I above was processed in an extrusion system which comprises a main extruder, and a side-arm extruder which is connected to the main extruder at the third stage of the main extruder.

The main extruder, manufactured by Black Clawson, is a 10 inch diameter three-stage single screw extruder with a 36 to 1 length to diameter ratio of about 360 inches in length having 10 heating zones. The single screw is manufactured by Berstorff. The extrusion was conducted at 30–40 RPM at an extrusion rate of 70 lbs/hr/rpm, die pressure from about 275 psi to about 325 psi. In the main extruder, the temperatures are set as follows:

Zones 1–5: about 310°–320° F.

Zones 6–10: about 280° F.

It is to be noted that the above temperature is an average temperature set at the barrel of the screw. However the temperature of the molten polymer can be significantly higher from shear heating and cracking reaction. The operation of the main extruder consists of three stages. The temperature of the polymer melt can be e.g. about 350°–450° F. Each stage includes a feed section, then a compression section, and then a metering section, First stage: Zones 1–3

Second stage: Zones 4–6

Third stage: Zones 7–10

The butene-1-ethylene copolymer from Part I was fed to the feed section of the first stage of the main extruder. The peroxide LUPERSOL 101 (2,5-Dimethyl-2,5-di(t-butylperoxy) hexane), manufactured by Atochem was added into the extruder at the metering zone of the fist stage at about 22 gallon per hour, thereby forming a polymer melt having about 3000 ppm by weight of peroxide, based on the total weight of the polymer and the peroxide in the polymer melt.

The molten polymer is cracked during extrusion by the peroxide to form polymers with lower molecular weight and volatile peroxide by-products including acetone, t-butyl alcohol, formaldehyde, etc. The volatile by-products, butene-1 monomers, and a portion of the peroxide are vented from the vents available at the last portion of the first stage and the second stage.

The total residence time of the polymer melt in the main extruder is about 3–5 minutes.

The polymer is cracked in the second stage of the screw extruder to the target melt index about 190 to about 250 dg/min monitored with an on-line melt flow meter located immediately after the third stage and before the die. The melt flow of the products was adjusted to meet target melt viscosity and/or melt index by changing the temperature in the main extruder.

PART III: MASTERBATCH AND SIDE-ARM EXTRUDER

A butene-1-ethylene copolymer, known as DP8310 produced by Shell Oil Company having melt index of about 3 dg/min is mixed with a sufficient amount of LUPERSOL 101 in a drum to form a masterbatch containing 20,000 ppm by wt of the peroxide, based on the total weight of the masterbatch of the polymer and the peroxide. The masterbatch is fed to the side-arm extruder.

The side-arm extruder is a Black Clawson 4 ½ inch diameter extruder with a 30 to 1 length to diameter ratio and 135 inches in length. It serves to melt and pump the masterbatch into the third stage of the main extruder. The extruder has 6 heating zones and is operated at 80–90 RPM with the temperatures set as following:

Zones 1–4: about 300° F.
Zone 5: about 310° F.
Zone 6: about 320° F.

The total residence time of the masterbatch in the side arm extruder is from about 30 to about 60 seconds. The temperature of the masterbatch in the side-arm extruder is about 340°–360° F.

PART IV: ADDITION OF MASTERBATCH TO MAIN EXTRUDER

The masterbatch exiting the side-arm extruder is fed to the compression zone in the third stage of the screw of the main extruder, which is about 30–60 seconds from the end of the extruder. The masterbatch and is mixed with the polymer in the main extruder in about 1:5 ratio (masterbatch to main extruder polymer), thereby forming a polymeric melt having about 3200 ppm of unreacted peroxide, based on the total weight of the end product mixture.

A Melt Flow Meter was used to monitor the viscosity change at the end of the third stage. The total residence time of the polymer in the main extruder is from about 3 to about 5 minutes.

PART V: UNDERWATER PELLETIZATION

The molten polymer from the extruder is fed to a pelletizer in which the polymer flows through the holes of die plate and cut by knives to form into approximately ⅛ inch diameter pellets, which are immediately quenched by chill water (60° F. or below) in the crystallization tank having an external pelletizing aid (Acumist® B12) in the water. Acumist B12 is a 10 micron high density polyethylene powder.

PART VI: PROPERTIES OF THE PELLETS

The run lasted for 9 hours without any upset from extruder or pelletized. This is a significant improvement over the prior art process which rarely can run continuously for longer than 2 hours without upset. The viscosities of off-line samples of pellets produced from 5 lots were measured with a Brookfield Viscometer using ASTM D2556 as following:

| 350° F. (cps) | 275° F. (cps) |
|---|---|
| 8,800 | 592,000 |
| 6,800 | 324,000 |
| 8,700 | 332,000 |
| 7,200 | 464,000 |
| 7,600 | 483,000 |

The viscosity specification of the pellets are as follows:

|  | Target | Acceptable Range |
|---|---|---|
| 350° F. | 8,500 cps | 6,500–105,000 cps |
| 275° F. | 390,000 cps | 200,000–500,000 cps |

ILLUSTRATIVE EMBODIMENT II

Approximately 469,798 pounds of butene-1-ethylene copolymer having the same composition and properties as described in Illustrative Embodiment I above was extrusion pelletized using the same equipment and similar conditions as described in Illustrative Embodiment I. The main extruder was operated at about 30–40 rpm and about 2250–3090 lbs/hr. The temperatures readings and settings of the heating zones were as follows:

| Zone # | Zone Temperature Setting °F. | Actual Zone Temperature Reading °F. |
|---|---|---|
| 1 | 200 | 289–313 |
| 2 | 200 | 255–314 |
| 3 | 200 | 335–360 |
| 4 | 280 | 267–310 |
| 5 | 280 | 280–310 |
| 6 | 280 | 300–323 |
| 7 | 280 | 280–288 |
| 8 | 280 | 265–300 |
| 9 | 280 | 279–289 |
| 10 | 280 | 296–317 |

The viscosity of the off line pellets samples taken after the crystallization tank are as follows:

| 350° F. (CPS) | 275° F. (cps) |
|---|---|
| 10,500 | 268,000 |
| 10,500 | 210,000 |
| 10,700 | 242,000 |
| 11,400 | 158,000 |
| 9,500 | 220,000 |
| 6,800 | 239,000 |
| 8,200 | 218,000 |

The masterbatch extruder extrusion rate is from about 163 to about 340 lbs/hr. The pellets produced contain about 3200 unreacted peroxide.

The properties of the products produced are summarized in TABLE 2. As used herein, prime products are products which fully meet the shipping and blending specifications. The recoverable rejects are products outside of shipping specification which can be reprocessed (e.g. recracked). Non-recoverable rejects are products outside of blending specification, e.g. viscosity too low, and reprocessing would not make it meet the specification.

COMPARATIVE EMBODIMENT

Butene-1-ethylene copolymer having the same composition and properties as described in Illustrative Example I was extrusion pelletized using the same equipment and peroxide, under similar conditions as described above, with the exception that no side-arm extruder was used, and all 6000 ppm of the peroxide was added to the main extruder at stage 1. No additional peroxide was added at the third stage. The breakdown of prime products, recoverable rejects and non-recoverable rejects are listed in TABLE 2 below.

TABLE 2

| CLASSIFICATION | COMPARATIVE | ILLUSTRATIVE EMBODIMENT II |
|---|---|---|
| PRIME | 20.7 | 71.8 |
| RECOVERABLE | 9.0 | 16.6 |
| NON-RECOVERABLE | 70.3 | 11.6 |
| TOTAL | 100.0 | 100.0 |

As illustrated in TABLE 2, the process of Illustrative Embodiment II of the present invention made 71.8% of prime product, whereas the prior art process of the Comparative Example only made 20.7% prime product. The improvement in prime product is over 250% using the process of the present invention.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

I claim:

1. A process for making polymer pellets comprising unreacted free radical generator which can be degraded upon thermal treatment to form an ultra low melt viscosity polyolefin having a melt viscosity of from about 500 to about 300,000 centipoise (cps) measured by Brookfield Viscometer using ASTM D2556 at 350° F., which process comprises the steps of:

(1) feeding a polymeric feedstock comprising a polyolefin having a melt index of from about 0.2 to about 100 dg/minute measured by ASTM 1238 condition E at 190° C. and 2.16 g wt to a main extruder through a feeding device, (2) determining amount (x) of free radical generator required to degrade said polyolefin from step (1) in said main extruder, under temperature(s) and residence time of said main extruder, to a polymer having a viscosity in a range which is (i) sufficiently high to allow easy pelletization by pelletizer into tractable uniform non-sticky pellets with less than 2% pellet agglomerates, and (ii) sufficiently low to allow blending without causing mechanical breakdowns of the mixing device by end user of the pellets;

(3) determining amount of loss (y) of unreacted free radical generator during extrusion process;

(4) determining total amount (z) of free radical generator required for degradation and loss in the main extruder by adding the amount x from step (2) with the amount of y from step (3), wherein z=x+y;

(5) adding said free radical generator in an amount from about 0.7 to about 1.2 time of z determined in step (4) above to (i) first one-half section of the main extruder or (ii) prior to the feeding of said polymeric feedstock to form a first mixture;

(6) cracking said first mixture in said main extruder under heat;

(7) adding a second mixture comprising (i) from about 0.1 to about 100 wt % of a free radical generator, and (ii) from about 0 to about 99.9 wt % of said polymeric feedstock into last half section of the main extruder to form a third mixture;

(8) passing said third mixture exiting the end of the main extruder to a pelletizer to form pellets;

wherein said second mixture is added in step (7) in an amount which provides sufficient amount of unreacted free radical generator in the pellets produced from step (8) above available for subsequent decomposition and cracking of the polymer in the pellets to form an ultra low melt flow polymer having from about 500 to about 300,000 cps, wherein the half life of the free radical generator used in step (5) is within about 0.1–1.0 times the half life of the free radical generator used in step (7).

2. The process as described in claim 1, wherein the free radical generator used in step (5) is the same as that used in step (7).

3. The process as described in claim 1, wherein said second mixture is passed through a side-arm extruder prior to the addition to said main extruder.

4. The process as described in claim 1, wherein said second mixture is added to said main extruder through an injection port.

5. The process as described in claim 1, wherein said main extruder comprises at least one vent at a position after the addition of said free radical generator in step (5) and prior to the addition of said second mixture in step (7).

6. The process as described in claim 1, wherein over 70% of said free radical generators added in step (5) are decomposed and/or lost through vent before reaching the exit of the main extruder.

7. The process as described in claim 1, wherein said polyolefin in said pellets produced has a viscosity from about 50,000 cps to about 500,000 cps measured at 275° F. using ASTM D2556 and from about 500 to about 300,000 cps measured at 350° F. using ASTM D2556.

8. The process as described in claim 1, wherein said free radical generator is selected from the group consisting t-butylperoxy-maleic acid, OO-t-butyl O-isopropyl monoperoxycarbonate, OO-t-butyl O-(2-ethoxyl) monoperoxycarbonate, 2,5-dimethyl 2,5-di(benzoyl-peroxy) hexane, OO-t-amyl O-(2-ethylhexyl), mono peroxy carbonate, t-butylperoxy acetate, t-amyl peroxy acetate, t-butylperoxy benzoate, t-amyl peroxy benzoate, di-t-butyl diperoxy-phthalate, dicumyl peroxide, 2,5-dimethl-2,5-di(t-butylperoxy) hexane, t-butyl cumyl peroxide, α-α-bis(t-butylperoxy) diisopropylbenzene, di-t-butyl peroxide, 2,5-dimethyl-2,5-di (t-butylperoxy) hexyne-3, n-butyl-4,4-bis (t-butylperoxy) valerate, 1,1-di(t-butylperoxy) 3,3,5-trimethyl cyclohexane, 1,1-di (t-butylperoxy) cyclohexane, 1,1-di-(t-amylperoxy) cyclohexane, 2,2-di (t-butyl-peroxy)butane, ethyl-3,3,-di (t-butylperoxy)butyrate, 2,2-di (t-amyl peroxy) propane, ethyl 3,3-di(t-amylperoxy) butyrate, and mixtures thereof.

9. The process as described in claim 1, wherein said polyolefin is a polypropylene homopolymer.

10. The process as described in claim 1, wherein said polyolefin is a polypropylene copolymer.

11. The process as described in claim 1, wherein said polyolefin is a 1-butene homopolymer.

12. The process as described in claim 1, wherein said polyolefin is a 1-butene copolymer.

13. The process as described in claim 1, wherein said polyolefin is a 1-butene-ethylene copolymer.

14. The process as described in claim 1, wherein said polyolefin is a 1-butene-propylene copolymer.

15. The process as described in claim 1, wherein said polymeric feedstock comprises a blend comprising propylene homo(co)polymer and butene-1 homo(co)polymer.

16. The process as described in claim 15, wherein said blend further comprises less than about 25 wt % of ethylene homo(co)polymer.

17. A process for making polymer pellets comprising unreacted 2,5-dimethyl-2,5-di(t-butylperoxy) hexane which can be degraded upon thermal treatment to form ultra low melt viscosity butene-1-ethylene copolymer having a melt viscosity measured by Brookfield Viscometer using ASTM D2556 at 350° F. of from about 3,000 to about 150,000 centipoise, which process comprises the steps of:

(1) feeding a polymeric feedstock comprising a butene-1-ethylene copolymer consisting essentially of (i) from about 92 wt % to about 98 wt % of butene-1 and (ii) from about 2 wt % to about 8 wt % of ethylene having a melt index of from about 0.1 to about 3.0 dg/min measured by ASTM 1238 condition E at 190° C. and 2.16 g wt to a main extruder through a feeding device, wherein total residence time for the polymeric feedstock in the main extruder from the feeding device to end of the main extruder ranges from about 2 minutes to about 6 minutes;

(2) adding from about 800 to about 3500 ppm of 2,5-dimethyl-2,5-di(t-butylperoxy) hexane to said polymeric feedstock (i) into about first one third section of the main extruder, or (ii) prior to the feeding of said polymeric feedstock to said extruder to form a first mixture;

(3) cracking said first mixture in the main extruder under heat;

(4) adding a second mixture comprising (i) from about 0.1 wt % to about 100 wt % of 2,5-dimethyl-2,5-di(t-butylperoxy) hexane and (ii) from about 0 to about 99.9 wt % of said polymeric feedstock, into last one third section of the main extruder to form a third mixture, (5) passing said third mixture exiting the end of the main extruder to a pelletizer to form pellets;

wherein said butene-1-ethylene copolymer in said polymer pellets has a viscosity of from about 200,000 cps to about 500,000 cps measured at 275° F. using ASTM D2556 and from about 3,000 to about 150,000 cps measured at 350° F. using ASTM D2556;

wherein said second mixture in step (4) is added to the main extruder in such amount that the polymer pellets produced comprises from about 2900 to 3500 ppm of unreacted peroxide.

18. The process as described in claim 17, wherein in step (4) said second mixture is passed through a side-arm extruder prior to the addition to said last one third section of said main extruder.

19. The process as described in claim 17, wherein in step (4) said second mixture is added to said last one third section of said main extruder through an injection port.

20. The process as described in claim 17, wherein said main extruder comprises at least one vent at a position after the position at which 2,5-dimethyl-2,5-di(t-butylperoxy)hexane is added in step (2) and before the second mixture is added to the main extruder in step (4).

21. The process as described in claim 17, wherein said ultra low melt viscosity butylene-1-ethylene copolymer has a viscosity of from about 6,500 cps to about 105,000 cps measured by Brookfield Viscometer using ASTM D2556 at 350° F.

* * * * *